US011584178B1

(12) United States Patent
Bosco et al.

(10) Patent No.: US 11,584,178 B1
(45) Date of Patent: Feb. 21, 2023

(54) INDEPENDENT SUSPENSION APPARATUS FOR A TRAILER

(71) Applicants: Manfred Bosco, Winnipeg (CA);
Cornelius Wipf, Cooks Creek (CA)

(72) Inventors: Manfred Bosco, Winnipeg (CA);
Cornelius Wipf, Cooks Creek (CA)

( * ) Notice: Subject to any disclaimer, the term of this patent is extended or adjusted under 35 U.S.C. 154(b) by 0 days.

(21) Appl. No.: 17/879,403

(22) Filed: Aug. 2, 2022

(51) Int. Cl.
*B60G 3/14* (2006.01)

(52) U.S. Cl.
CPC ............ *B60G 3/14* (2013.01); *B60G 2200/31* (2013.01); *B60G 2204/4306* (2013.01); *B60G 2300/04* (2013.01)

(58) Field of Classification Search
None
See application file for complete search history.

(56) References Cited

U.S. PATENT DOCUMENTS

| | | | |
|---|---|---|---|
| 4,252,340 A | 2/1981 | Egging | |
| 4,455,038 A | 6/1984 | Capler et al. | |
| 4,553,735 A | 11/1985 | Brundage | |
| 4,593,930 A | 6/1986 | Davis | |
| 4,615,539 A | 10/1986 | Pierce | |
| 4,934,733 A | 6/1990 | Smith et al. | |
| 5,016,912 A | 5/1991 | Smith et al. | |
| 5,275,430 A | 1/1994 | Smith | |
| 5,683,098 A * | 11/1997 | VanDenberg | B60G 9/003 280/86.75 |
| 5,839,750 A | 11/1998 | Smith | |
| 6,340,165 B1 * | 1/2002 | Kelderman | B60G 21/0556 280/124.153 |
| 8,235,403 B2 * | 8/2012 | VanDenberg | B60G 3/145 280/124.128 |

FOREIGN PATENT DOCUMENTS

| | | | | |
|---|---|---|---|---|
| GB | 2194761 A * | 3/1988 | ............ | B60G 11/27 |
| WO | WO-9204197 A1 * | 3/1992 | ............... | B60G 3/14 |

* cited by examiner

*Primary Examiner* — Faye M Fleming
(74) *Attorney, Agent, or Firm* — Ryan W. Dupois; Kyle R. Satterwaite; Ade & Company Inc.

(57) ABSTRACT

An independent suspension apparatus includes a cross beam mounted on two transversely spaced mounting elements of a trailer. Two axle frames are independently pivoted on the cross beam to extend longitudinally of the trailer to distal ends that support stub axles for mounting wheels thereon. A suspension element is supported on each axle frame to act between the axle frame and the trailer frame to support weight of the trailer thereon. Each axle frame is pivotally supported on the cross beam by two hinges, in which each hinge is laterally spaced from the other hinges. Optional adjustment assemblies of each hinge allow the axle frames to be adjustably aligned relative to the trailer frame. In one embodiment, an abutment member is cantilevered from the cross beam to support an upper end of the suspension element relative to the trailer frame.

20 Claims, 9 Drawing Sheets

INDEPENDENT SUSPENSION APPARATUS FOR A TRAILER

FIELD OF THE INVENTION

The present invention relates to an independent suspension apparatus for use on a trailer, for example using a gas bag suspension element for use on a highway transport trailer.

BACKGROUND

Conventional suspension systems for semi-truck trailers have a single axle which extends from each side of the trailer wherein the wheels are mounted at each end. The conventional trailer suspension system is arranged such that when a respective wheel on a side of the trailer engages a bump or the like, the suspension rocks tilting the trailer from side to side and the system does not provide independent movement of each wheel.

Some examples of suspension systems for trailers which provide independent suspension are as follows, U.S. Pat. No. 4,453,735 (Penverne et al), U.S. Pat. Nos. 5,275,430—5,016,912—4,934,733 and 5,839,750 (all of Smith et al), U.S. Pat. No. 4,455,038 (Capler et al), U.S. Pat. No. 4,615,539 (Pierce), U.S. Pat. No. 4,252,340 (Egging), and U.S. Pat. No. 4,593,930 (Davis). The above mention suspension systems have a limited support arrangement for individual wheels or are configured in a manner that the suspension system is inadequate for or incompatible with large and heavy trailer applications including conventional semi truck trailer. For instance, the pivoting frames that support the wheels relative to the trailer frame may be prone to twisting under heavy loads or on trailers pulled along roads having rough conditions.

SUMMARY OF THE INVENTION

According to one aspect of the invention there is provided an independent suspension apparatus for a trailer having a trailer frame including two mounting elements at transversely spaced positions on the trailer, the independent suspension apparatus comprising:

a cross beam arranged to be mounted on the trailer to extend in a lateral direction across the trailer for connection to the two transversely spaced mounting elements of the trailer;

first and second axle frames supported at respective ends of the cross beam;

the first and second axle frames extending longitudinally of the trailer from respective proximal ends of the axle frames pivotally supported on the cross beam at spaced apart positions in the lateral direction to respective distal ends of the axle frames for independent pivotal rotation of the axle frames about respective frame axes parallel to the beam;

first and second stub axles supported on the distal ends of the first and second axle frames respectively with each stub axle extending parallel to the beam;

each stub axle including a wheel mount hub for mounting a wheel for rotation about an axis parallel to the beam with the wheel mount hub located outwardly of a respective end of the beam;

each axle frame having a suspension element mounted on the distal end of the axle frame providing sufficient load bearing compression to support weight of the trailer thereon; and each axle frame having two hinges pivotally supporting the axle frame on the cross beam, the hinges of each axle frame being spaced apart in the lateral direction from one another and from the hinges of the other axle frame.

The spaced apart hinges on the cross beam provide strong support between the axle frames and the trailer frame, while reinforcing the trailer frame, to maintain alignment of the axle frames relative to the trailer frame and alignment of the wheels carried by the axle frames. Further providing each hinge with at least one adjustment member enables adjustment of the frame axis of the respective axle frame to be adjusted relative to the cross beam in at least two directions whereby the axle frames are independently adjustable in orientation relative to the cross beam.

When the cross beam has two mounting brackets each for attachment to a respective one of the transversely spaced mounting elements of the trailer, the two hinges of each axle frame preferably include an outer hinge located at a corresponding one of the mounting brackets and an inner hinge spaced laterally inwardly from the mounting bracket.

Preferably the inner hinges are laterally spaced apart from one another.

According to one embodiment, the apparatus may further comprise: (i) each axle frame having an outer support arm and an inner support arm extending longitudinally of the trailer from the two hinges of the axle frame respectively to the distal end of the axle frame; and (ii) each hinge having a shaft supported on the cross beam, a cuff fixedly mounted on the respective support arm, and a bearing member received within the cuff and pivotally supporting the respective support arm on the shaft.

Each hinge may be supported on the beam between a top and a bottom of the beam in elevation. According to one preferred embodiment, when the cross beam includes a plurality of flanges extending along a length of the cross beam and defining an exterior boundary of the cross beam, the frame axis of each axle frame may be situated within an exterior boundary of the cross beam.

In one embodiment, the cross beam may comprise a C-shaped channel which is open along one side of the cross beam.

According to the first illustrated embodiment, the apparatus further comprises: (a) the cross beam including a plurality of flanges extending along a length of the cross beam and defining an exterior boundary of the cross beam, (b) each hinge including (i) a shaft pivotally supporting a portion of the respective axle frame thereon and (ii) a pair of parallel mounting plates supporting the shaft thereon, and (c) each mounting plate being fixedly mounted onto two flanges among the plurality of flanges of the cross beam.

Each axle frame may further comprise: (i) an outer support arm and an inner support arm extending longitudinally of the trailer from the two hinges of the axle frame respectively to the distal end of the axle frame; (ii) a distal crossbar connected between the inner support arm and the outer support arm at the distal end of the axle frame; and (iii) a proximal crossbar connected between the inner support arm and the outer support arm at the proximal end of the axle frame so as to be spaced apart from the distal crossbar. The proximal crossbar may be spaced longitudinally of the trailer from the frame axis of the axle frame to provide adequate support to the proximal end of the axle frame in addition to support between the hinges by the cross beam. Each axle frame may further comprise an intermediate crossbar connected between the inner support arm and the outer support arm at an intermediate location spaced longitudinally of the trailer from the distal crossbar and the proximal crossbar.

The apparatus as described above may further comprise: (i) the suspension element having a lower end mounted on a seat on the respective stub axle, (ii) an abutment member having an abutment end engaging an upper end of the suspension element for transferring loads from the upper end of the suspension element to the frame, and (iii) the abutment member having an opposed end mounted on the beam so as to be cantilevered from the beam to the abutment end and so that loads from the upper end of the suspension element are communicated through the abutment member to the beam and from the beam to the frame.

According to a second aspect of the present invention there is provided an independent suspension apparatus for a trailer having a frame including two mounting elements at transversely spaced positions on the trailer, the independent suspension apparatus comprising:

a cross beam arranged to be mounted on the trailer and to extend across the trailer for connection to the two transversely spaced mounting elements of the trailer;

first and second coaxial stub axles mounted at respective ends of the beam with each stub axle extending parallel to the beam;

each stub axle including a wheel mount hub for mounting a wheel for rotation about an axis parallel to the beam with the wheel mount hub located outwardly of a respective end of the beam;

each stub axle having a respective pair of support arms extending longitudinally of the trailer from the beam to the respective stub axle with the respective pair of support arms being pivotally mounted relative to the beam for pivotal rotation about an axis parallel to the beam;

each stub axle having a suspension element with a lower end mounted on a seat on the respective stub axle;

and an abutment member having an abutment end engaging an upper end of the suspension element for transferring loads from the upper end of the suspension element to the frame;

the abutment member having an opposed end mounted on the beam so as to be cantilevered from the beam to the abutment end and so that loads from the upper end of the suspension element are communicated through the abutment member to the beam and from the beam to the frame.

The cantilevered support of the upper end of suspension element using the abutment member simplifies the mounting of the suspension apparatus to the trailer frame as the mounting of the cross beam to the trailer frame is the only connection required when the abutment member is carried on the cross beam.

The abutment member may be mounted on the beam at a forward end of the abutment member so as to extend upwardly and rearwardly therefrom.

The beam may include two mounting brackets each for attachment to a respective one of the mounting elements of the trailer.

Each abutment member may be mounted on the beam at a position on the beam inward of the mounting bracket.

When the mounting elements of the trailer comprise respective ones of two parallel beams of the frame of the trailer, the abutment members may extend from the beam upwardly to an area between the beams of the frame.

The support arms may be mounted on hinges carried on the beam. One of the hinges may be located at the respective bracket while the other is spaced inwardly from the bracket.

The stub axle is preferably fixedly connected to the two support arms.

The suspension element may be mounted between the support arms.

The support arms are spaced by a distance just to receive the suspension element, for example a gas bag spring, therebetween.

The abutment end engaging the upper end of the suspension element forms a flat plate. The flat plate may be substantially horizontal.

The abutment member may comprise a channel member with the upper end of the gas bag spring carried on a web of the channel member and with two depending sides of the channel member.

A shock absorber may extend upwards from the stub axle or the support arms to the abutment member.

A pair of brake assemblies may each be mounted on a respective axle and arranged to control a brake on each wheel.

A height control assembly may be arranged to gauge the height of each arm assembly and when the suspension element is an air bag is further arranged to control the pressure of air in each air bag relative to the height of each arm in relation to the trailer frame.

According to a further aspect of the present invention there is provided a trailer comprising (i) a trailer frame including two mounting elements at transversely spaced positions on the trailer, and (ii) a plurality of ground wheels assemblies for supporting the trailer from the ground, in which each ground wheel assembly is mounted by a respective one of a plurality of independent suspension apparatus as described above according to any aspect of the invention.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Referring to the accompanying figures, there is illustrated an independent suspension apparatus generally indicated by reference numeral 10. The apparatus 10 is particularly suited for use in a transport trailer 12 of the type for connection to a towing vehicle for transporting cargo, for example a highway transport trailer or semi-trailer of the type commonly used with a highway tractor, also referred to as a semi-truck.

A typical transport trailer 12 includes a trailer frame comprised of two longitudinal beams that extend in the longitudinal direction of the trailer in parallel relation to one another at laterally spaced apart positions. The beams support a trailer body 16 thereon, for example a cargo deck or box having a suitable supporting surface upon which cargo can be transported. A hitch connection (not shown) is provided on the trailer frame at a forward end for connection to the towing vehicle. A set of wheels 18 are supported relative to the trailer frame at the rear of the trailer by the suspension apparatus 10 described herein.

Figure 1:
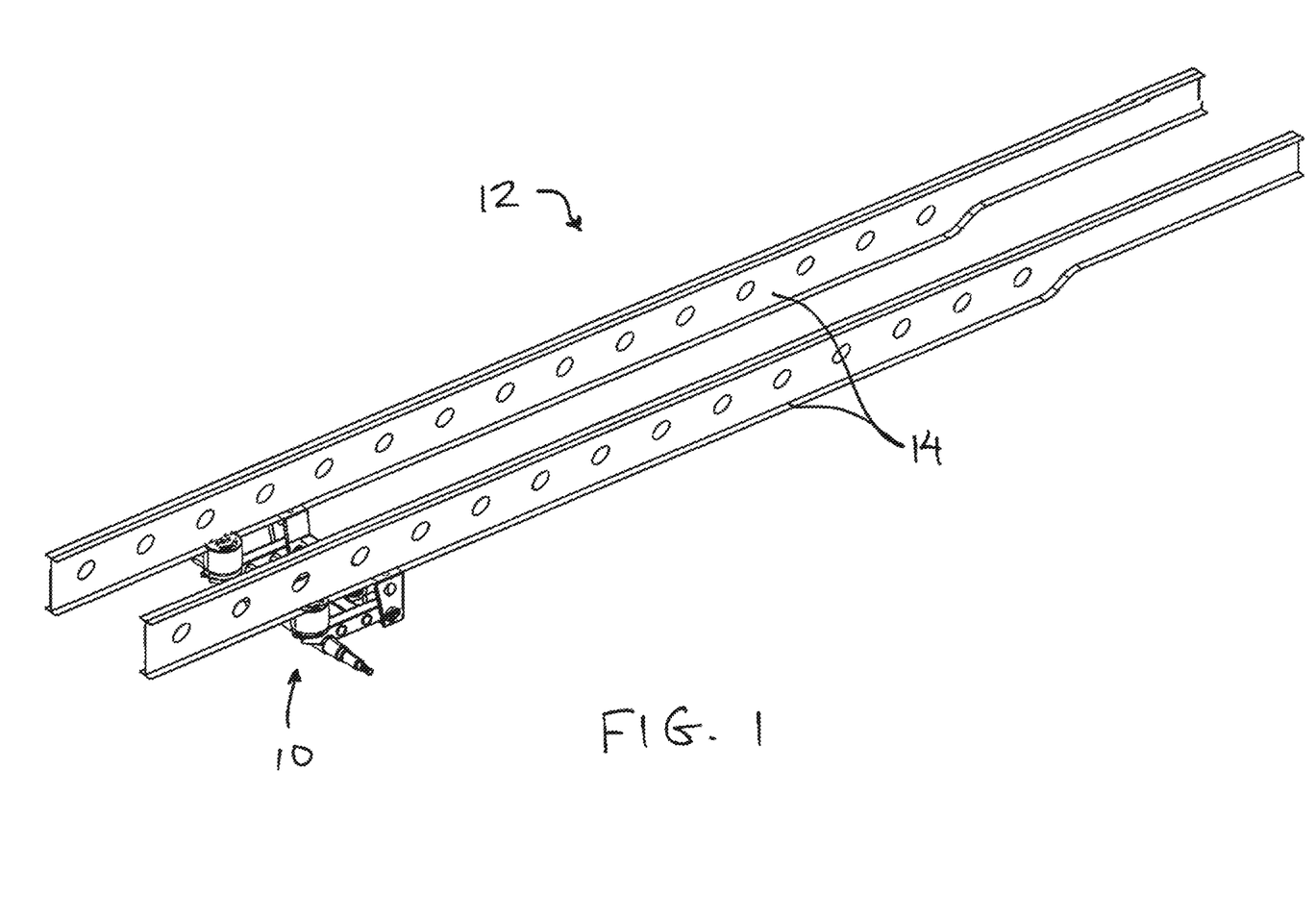
FIG. 1 is a perspective view of a first embodiment of the independent suspension apparatus shown supporting the longitudinal beams of a trailer frame thereon.
Figure 2:
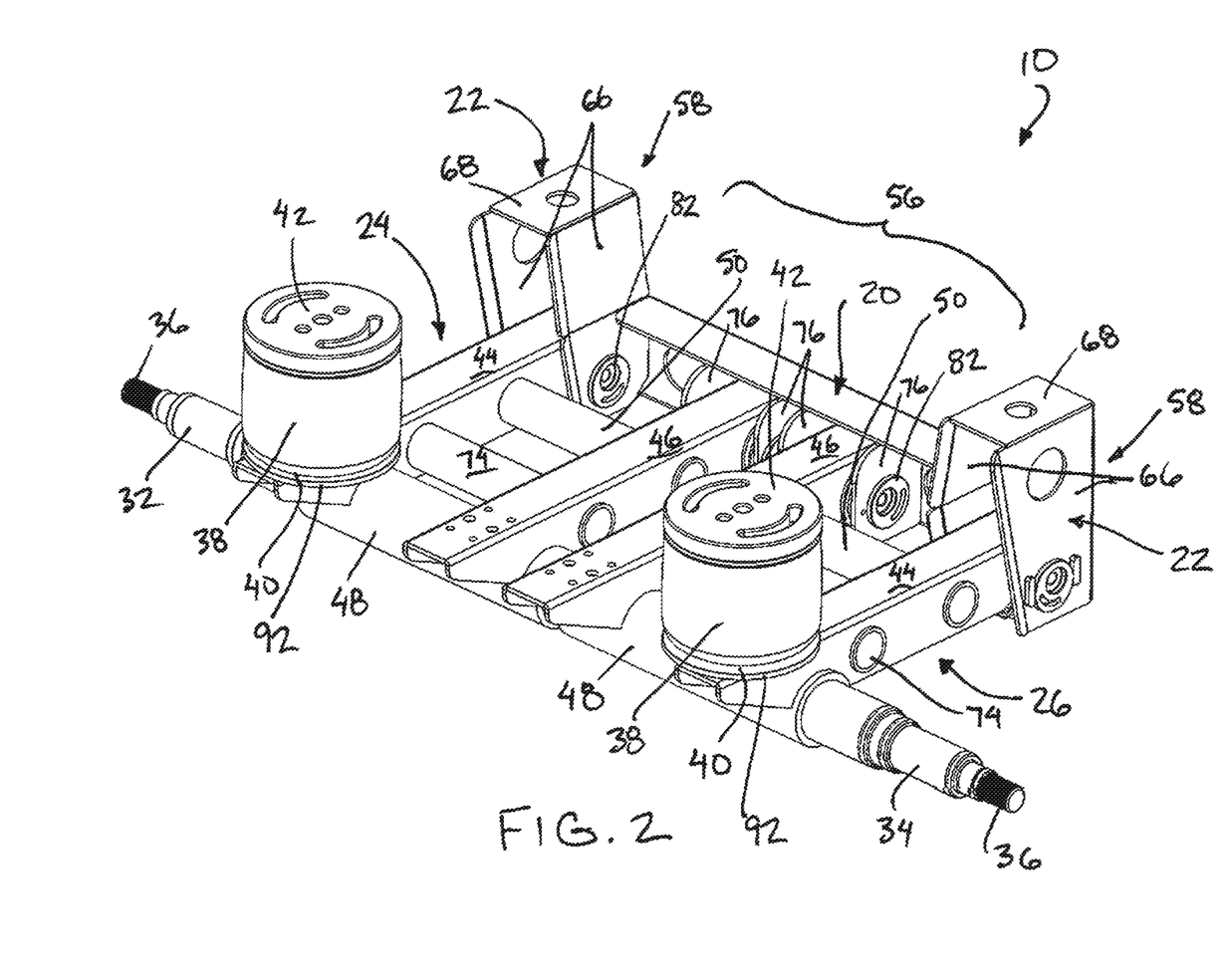
FIG. 2 is a top perspective view of the apparatus according to the first embodiment of FIG. 1 shown removed from the trailer frame.
Figure 3:
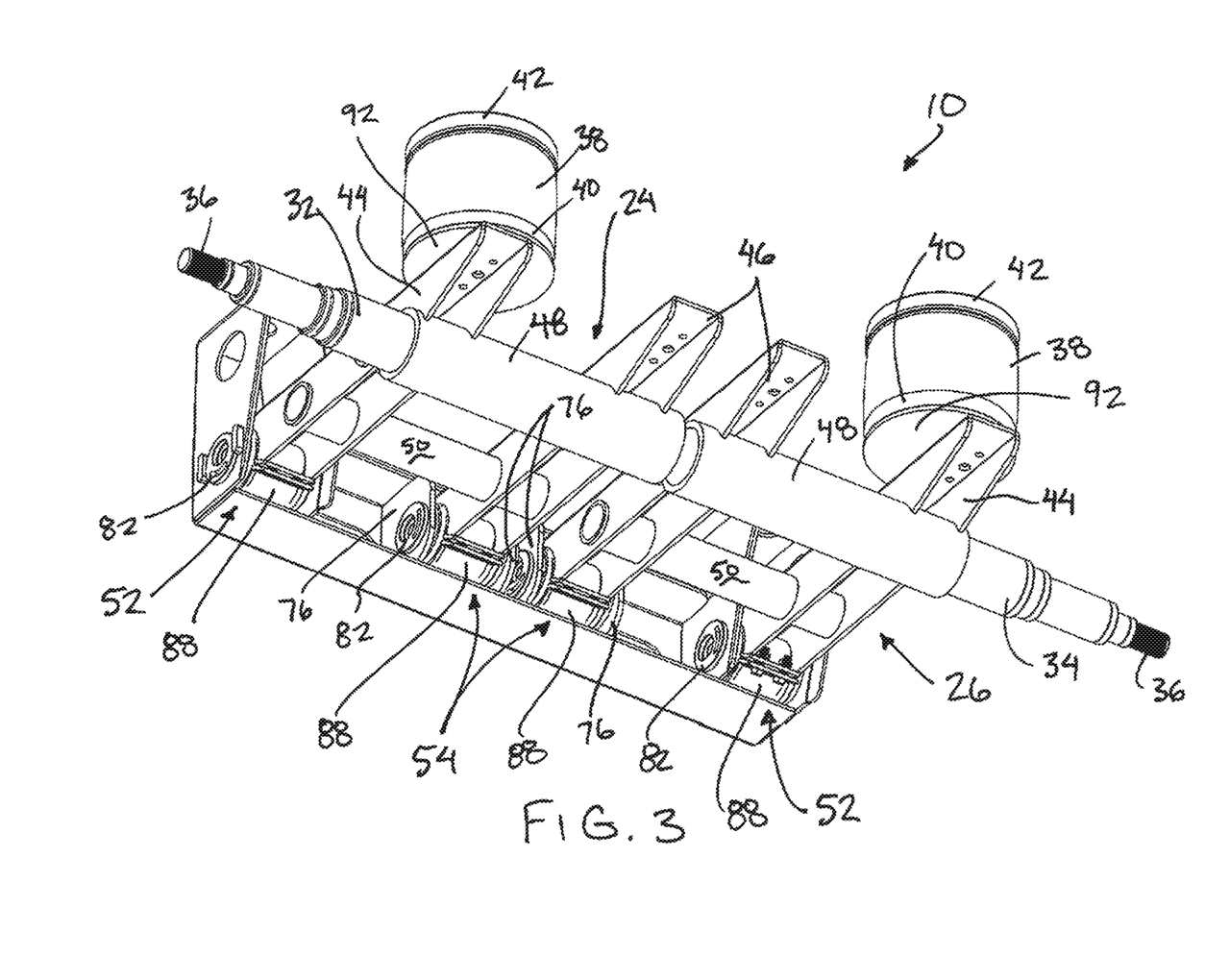
FIG. 3 is a bottom perspective view of the apparatus according to the first embodiment of FIG. 1 shown removed from the trailer frame.
Figure 4:
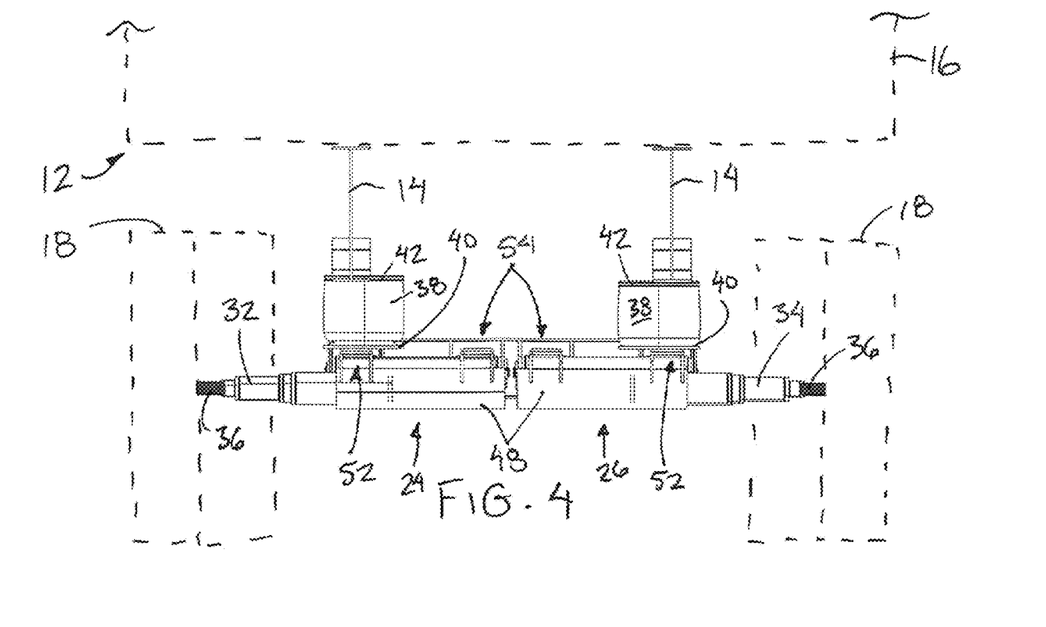
FIG. 4 is a rear elevational view of the apparatus according to the first embodiment of FIG. 1 shown supporting the longitudinal beams of the trailer frame thereon in which additional features of the trailer are shown in broken line.
Figure 5:
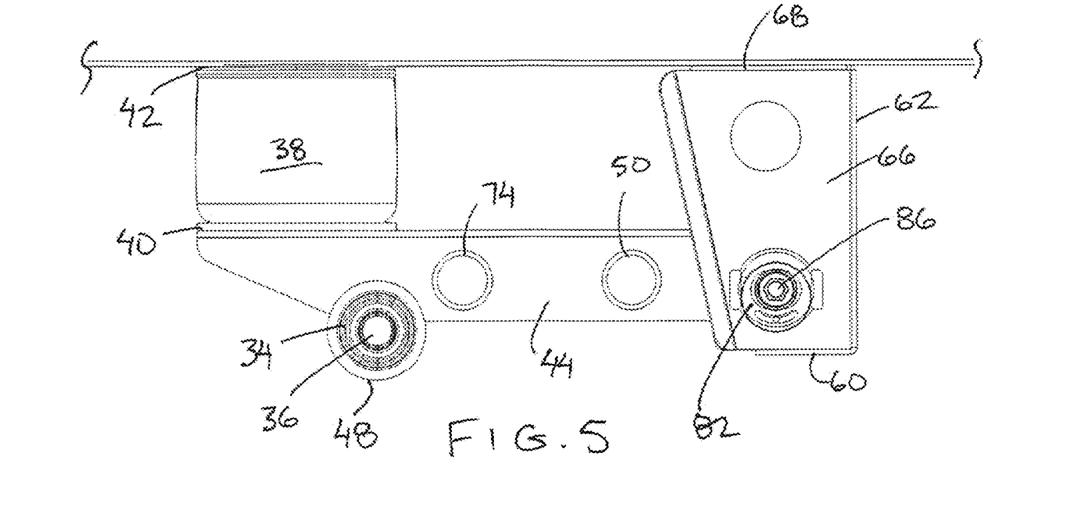
FIG. 5 is side elevational view of the apparatus according to the first embodiment of FIG. 1 shown supporting the longitudinal beams of the trailer frame thereon.

The set of wheels may comprise a single wheel at each of the laterally opposed sides of the trailer so as to provide independent suspension to the trailer frame supported thereon by the suspension apparatus 10. Alternatively, the set of wheels may comprise dual wheels at each of the laterally opposed sides of the trailer as shown schematically in FIG. 4, in which the dual wheels at one side of the trailer frame are independently suspended relative to the dual wheels at the laterally opposing side of the trailer frame. In each instance the wheels are oriented for rolling forwardly in the longitudinal direction of the trailer. Furthermore, two apparatus 10 may be mounted on the trailer at longitudinally spaced mounting locations to support two separate sets of wheels at the rear of the trailer frame.

Although various embodiments of the apparatus 10 are shown in the accompanying figures, the features in common with the various embodiments will first be described. In each instance the apparatus 10 includes a cross beam 20 which extends in a lateral direction perpendicularly to the longitudinal direction of the trailer between two mounting brackets 22 at opposing ends of the cross beam. The mounting brackets are spaced apart from one another for alignment with the two longitudinal beams 14 of the trailer respectively. In the illustrated embodiment the longitudinal beams 14 each comprise an I-beam having an upper flange and a lower flange joined by a vertical web such that the lower flange acts as a mounting element onto which a corresponding one of the mounting brackets 22 of the apparatus 10 can be mounted when the apparatus 10 is mounted relative to the trailer. The mounting of the cross beam between the longitudinal beams of the trailer frame at a location below the beams provides stiffening support to the frame of the trailer.

The apparatus 10 further includes a first axle frame 24 and a second axle frame 26 pivotally coupled to the cross beam 20 adjacent the opposing first and second ends of the cross beam respectively such that the axle frames are laterally spaced apart from one another. Each axle frame extends longitudinally of the trailer to extend rearwardly from a proximal end 28 of the axle frame that is pivotally supported on the cross beam to a distal end 30 which is farthest from the cross beam.

A first stub axle 32 is supported on the distal end of the first axle frame 24 and a second stub axle 34 is supported on the distal end of the second axle frame 26. Each of the stub axles 32 and 34 supports a wheel mounting hub 36 thereon upon which a single wheel or dual wheels can be supported for rotation about a wheel axis lying parallel to the cross beam 20 and parallel to a frame axis about which the axle frame is pivotal relative to the cross beam. The wheel mounting hub is positioned laterally outwardly of the end of the beam to support a wheel thereon such that the wheel is in turn supported laterally outwardly from the end of the cross beam and laterally outward relative to a corresponding longitudinal beam 14 of the trailer.

The trailer may be further provided with a pair of brake assemblies which are mounted on the stub axles respectively for controlling a brake on the wheel(s) associated with the respective stub axle.

Each axle frame further includes a suspension element 38 which is mounted on the distal end of the axle frame at a lower end 40 to extend upwardly therefrom to an upper end 42 that is secured in fixed relation relative to the trailer frame. The suspension element can take various forms including coil springs supported under compression or an airbag spring also supported under compression so that weight of the trailer and cargo supported thereon can be resiliently supported relative to the wheel axles while providing sufficient load bearing compression to support the weight thereon. In the illustrated embodiments, the suspension elements 38 comprise airbag springs having a resilient pressure containing chamber supported between a first mounting plate defining the lower end 40 of the suspension element and a second mounting plate defining the upper end 42 of the suspension element. The first and second mounting plates comprise rigid parallel plates with suitable fastener apertures therein to permit fixed mounting onto respective mounting surfaces of the suspension apparatus 10 and/or the trailer frame.

The airbag springs forming the suspension elements 38 in the illustrated embodiment can include a height control assembly in cooperation therewith which is arranged to gauge the height of the distal end of each axle frame relative to the trailer frame while being further arranged to control pressure of air within each airbag relative to the height of each arm in relation to the trailer frame. In this manner, as weight of cargo on the trailer is varied, the height control assembly can provide suitable pressure to the airbags to maintain the distal ends of the axle frames at a prescribed height relative to the trailer frame in response to feedback regarding height of the distal end of the axle frame. In some embodiments, the suspension apparatus may further include shock absorbers in connection between the distal ends of respective axle frames and an upper mounting element that is supported in fixed relation to the trailer frame.

Each axle frame of the suspension apparatus 10 includes an outer support arm 44 and an inner support arm 46 which are parallel and laterally spaced apart from one another to extend longitudinally of the trailer between the opposing distal and proximal ends of the axle frame. The inner and outer support arms are rigidly connected to one another at the distal end of the axle frame by a distal crossbar 48 in the form of a tubular sleeve extending laterally between the distal ends of the support arms in parallel relation to the frame axis about which the axle frame is pivoted relative to the cross beam. The tubular sleeve forming the distal crossbar 48 receives a respective one of the stub axles 32 or 34 therein such that the wheel mounting hub 36 at the end of the stub axle protrudes outward from the outer end of the sleeve forming the distal crossbar. The inner and outer support arms are further rigidly connected to one another at the proximal end of the axle frame by a proximal crossbar 50. The proximal crossbar in the illustrated embodiment also comprises a tubular sleeve extending laterally between the support arms in parallel relation to the frame axis, but at a location which is adjacent to the proximal ends of the support arms.

Each axle frame 24 and 26 is pivotally coupled to the cross beam by a pair of hinges including an outer hinge 52 coupling the axle frame to the cross beam adjacent a corresponding one of the mounting brackets 22 at the corresponding end of the cross beam and an inner hinge 54 coupling the axle frame to the cross beam at a location spaced laterally inwardly from the outer hinge.

Turning now more particularly to the first embodiment shown in FIGS. 1 through 7, in this instance the cross beam 20 includes (i) a main portion 56 comprising a channel with a C-shaped profile that is open to a rear side from which the axle frames protrude and (ii) two end portions 58 extending upwardly from the main portion 56 at the opposing ends of the cross beam to form the mounting brackets 22 that serve to mount the cross beam onto the longitudinal beams 14 of the trailer frame.

The cross beam as illustrated includes a bottom flange 60 that spans the full-length of the cross beam in the lateral direction between opposing ends thereof and a web flange 62 that extends upwardly from a front edge of the bottom flange 60 at the front side of the cross beam across the full length of the beam in the lateral direction between the opposing ends thereof. A top flange 64 protrudes rearwardly from the upper edge of the web flange 62 to extend along a length of the cross beam between the mounting brackets 22 at the opposing ends of the cross beam. The top flange 64 is horizontal and parallel to the bottom flange 60 below. The bottom flange, the web flange and the top flange collectively define the C-shaped profile of the channel defining the main portion 56 of the cross beam and collectively define an exterior boundary of the cross beam surrounding a hollow interior of the cross beam which received the hinges 52 and 54 therein.

At the end portions 58 of the cross beam, two parallel plates 66 span a full height of the cross beam so as to be joined parallel to one another and perpendicularly to the lateral direction that the cross beam extends. Each of the parallel plates 66 is joined along a bottom edge to the bottom flange 60 and joined along a front edge to the web flange 62. The parallel plates 66 extend above the height of the top flange 64 and are joined at the top ends thereof by a top plate 68 defining a mounting surface of the mounting bracket 22 that is arranged to be mounted in parallel abutment to the bottom surface of the corresponding longitudinal beam 14 of the trailer defining one of the mounting elements of the trailer supporting the apparatus 10 thereon. The top plate 68 of each mounting bracket 22 is horizontally oriented at a location parallel to the top flange 64 and spaced above the top flange of the main portion of the cross beam. An innermost one of the parallel plates 66 of each end portion is joined to the top flange 64 of the cross beam so that the top flange of the main portion 56 of the cross beam is supported at opposing ends thereof on the plates of the mounting brackets 22.

In the first embodiment, the inner support arm and the outer support arm 44 and 46 each comprises a channel having a U-shaped profile including a top flange 70 and two side flanges 72 extending downwardly from opposing edges of the top flange along the length of the support arm. The distal crossbar is supported on the side flanges 72 at the distal end of the axle frame. The proximal crossbar 50 is mounted between the support arms at a location spaced longitudinally of the trailer rearward of the hinges and rearward of the frame axis defining the axis of rotation of the axle frame relative to the cross beam.

In the first embodiment, each axle frame further includes an intermediate crossbar 74 which is mounted relative to the side flanges 72 of both support arms to be parallel to the frame axis at a location closer to the distal end of the axle frame than the proximal end while remaining spaced longitudinally of the trailer from both the proximal crossbar and the distal crossbar at an intermediate location therebetween.

Each of the inner hinge 54 and the outer hinge 52 according to the first embodiment is supported on the cross beam by two parallel and laterally spaced apart plates providing support. Each one of the inner hinges includes two mounting plates 76 fully spanning the height of the main portion 56 of the cross beam so as to be fixedly joined to the top and bottom flanges 64 and 60 while also being joined along the front edge to the web flange 62 along the full height thereof. Each one of the outer hinges 52 is supported by the parallel plates 66 associated with a corresponding one of the mounting brackets 22 at the end of the cross beam.

Figure 6:
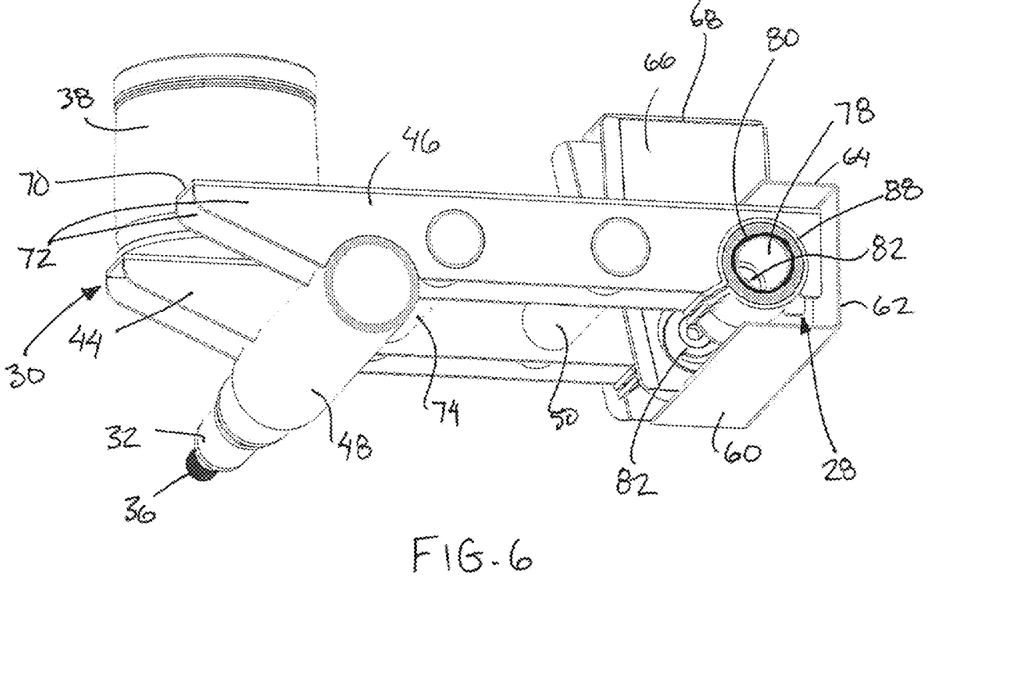
FIG. 6 is a perspective view of the apparatus according to the first embodiment of FIG. 1 in which a portion of one of the hinges is shown in cross-section.
Figure 7:
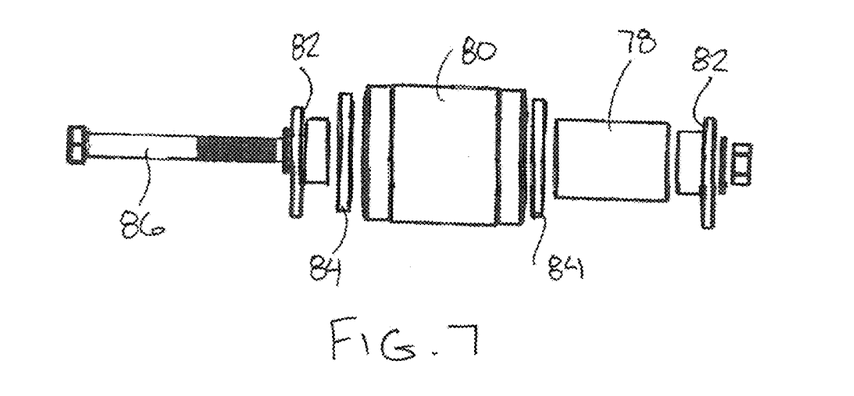
FIG. 7 is an exploded view of the internal components of one of the hinges of the apparatus according to the first embodiment of FIG. 1.
Figure 8:
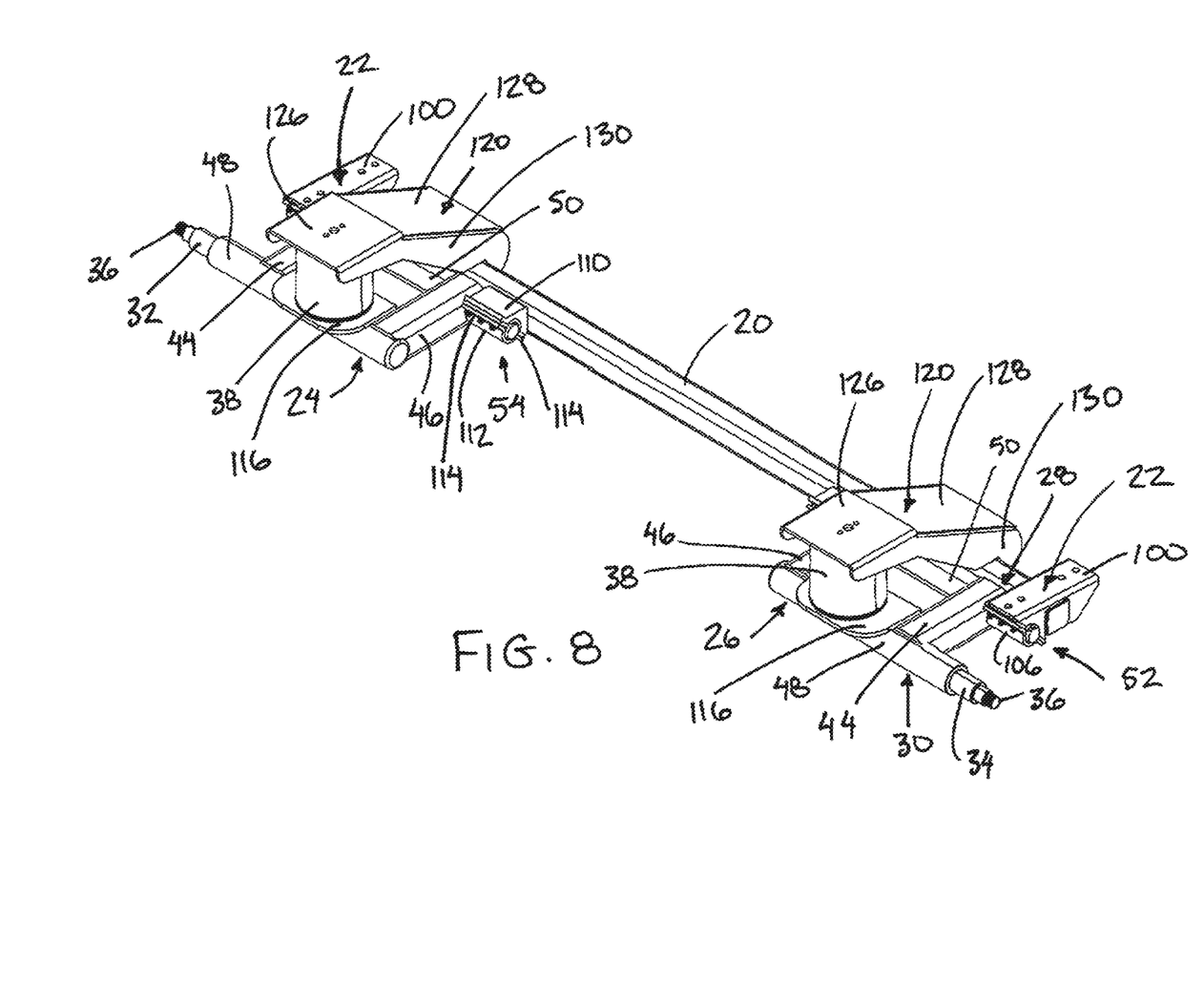
FIG. 8 is a perspective view of a second embodiment of the independent suspension apparatus shown removed from the trailer frame.
Figure 9:
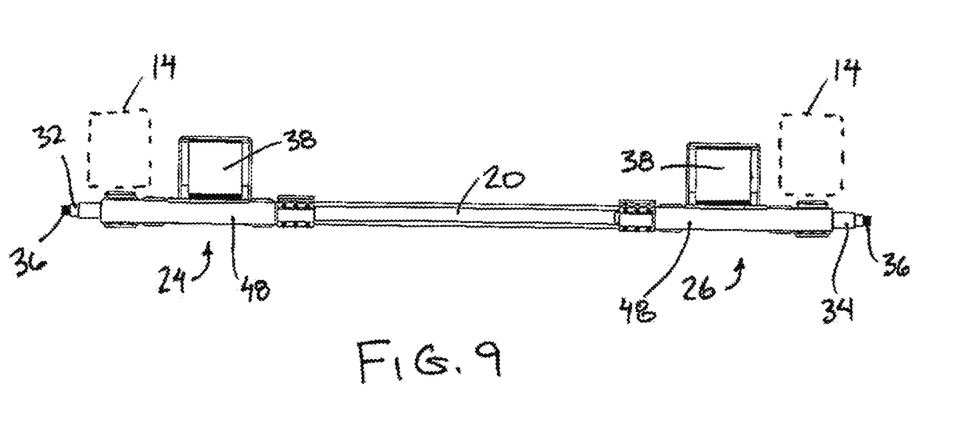
FIG. 9 is rear elevational view of the apparatus according to the second embodiment of FIG. 8 shown supporting the longitudinal beams of the trailer frame thereon in which the longitudinal beams are represented in broken line.
Figure 10:
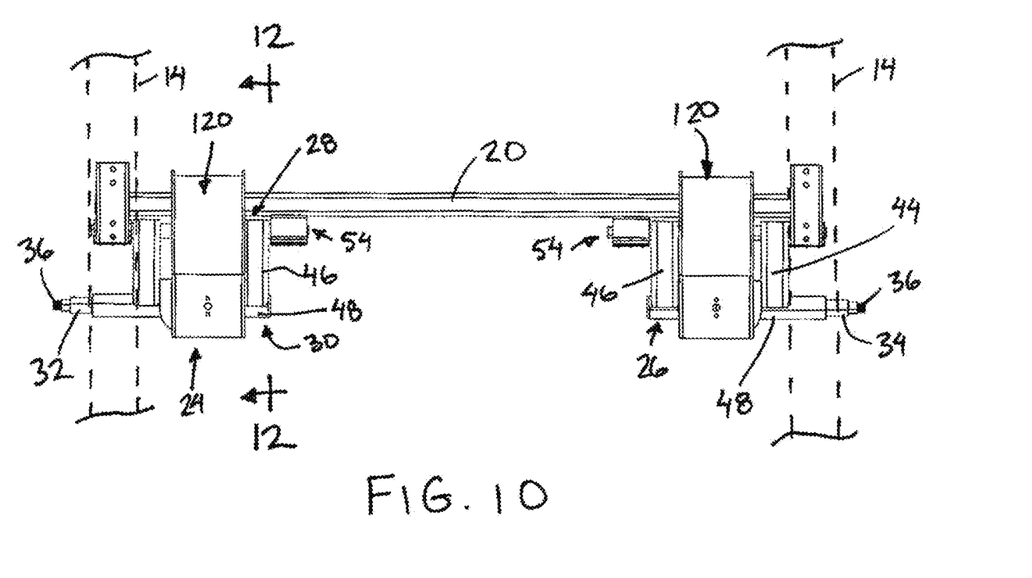
FIG. 10 is a top plan view of the apparatus according to the second embodiment of FIG. 8 shown supporting the longitudinal beams of the trailer frame thereon in which the longitudinal beams are represented in broken line.
Figure 11:
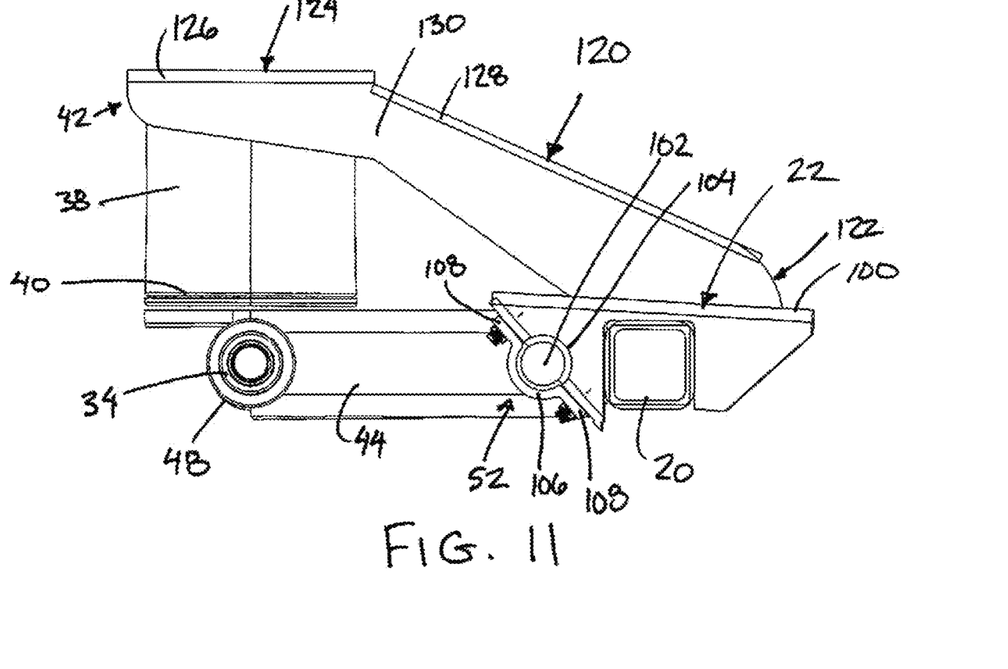
FIG. 11 is a side view of the apparatus according to the second embodiment of FIG. 8 shown removed from the trailer frame.
Figure 12:
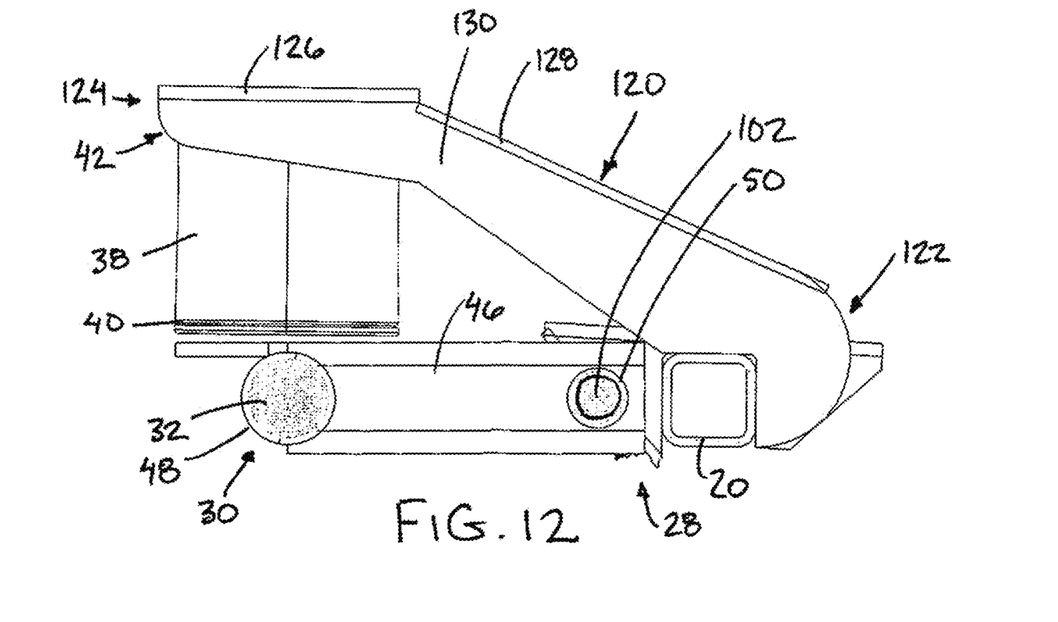
FIG. 12 is a sectional view of the apparatus according to the second embodiment of FIG. 8, along the line 12-12 in FIG. 10.
Figure 13:
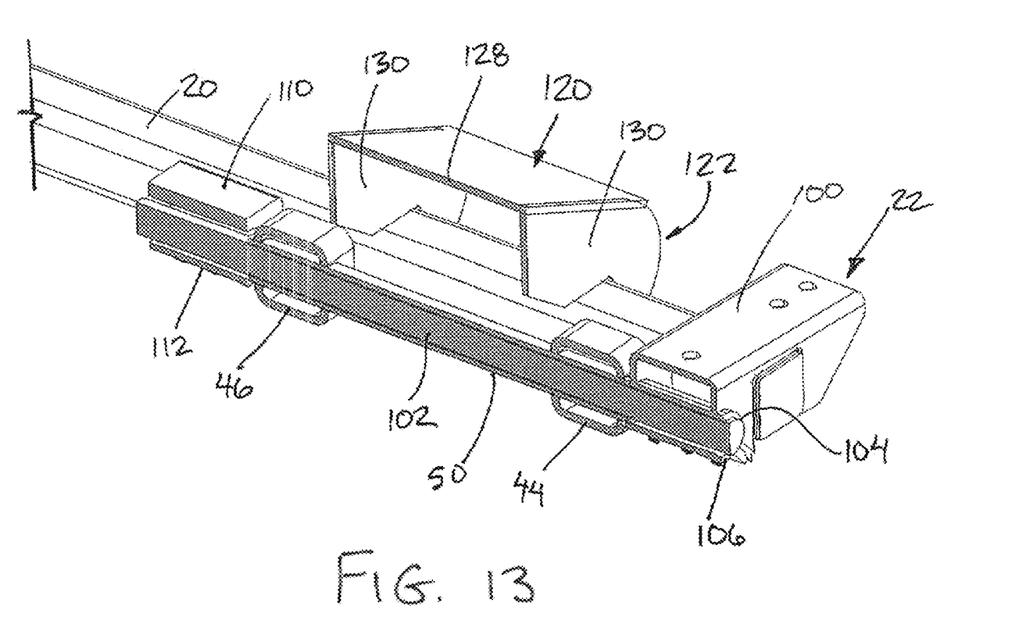
FIG. 13 is sectional view of one of the axle frames of the apparatus according to the second embodiment of FIG. 8 representing a vertical cut plane aligned with the axis of rotation of the axle frame.

Each of the inner and outer hinges 54 and 52 comprises an adjustable assembly permitting the axis of rotation of the axle frame to be adjusted up and down or for and aft relative to the trailer frame to align the first and second axle frames with one another for rotation about a common axis of rotation or to align the axle frames relative to the trailer frame. Each hinge assembly includes an inner sleeve 78 which is supported relative to the corresponding mounting plates 76 or 66 such that the inner sleeve 78 defines a pivot shaft that locates the corresponding axis of rotation of the hinge. The inner sleeve supports a tubular bushing 80 thereon onto which the proximal end of a corresponding one of the support arms 44 or 46 is pivotally supported relative to the trailer frame. The inner sleeve 78 is mounted at laterally opposing ends on adjustable members 82 each having a circular boss at one side that is received within the corresponding open end of the inner sleeve 78 and which is eccentrically mounted relative to a corresponding end plate of the adjustment member 82. The endplate of the adjustment member 82 can be rotated about an adjustment axis relative to the corresponding mounting plate upon which it is supported to vary the position of the circular boss which in turn varies the position of the end of the inner sleeve 78 supported thereon relative to the cross beam and trailer frame upon which it is mounted. A suitable washer 84 is mounted about the inner sleeve 78 at opposing ends for being clamped against opposing annular end faces of the tubular bushing 80 received therebetween. In a mounted position of the adjustment assembly, a through bolt 86 extends fully through the adjustment assembly of the hinge for clamping the bushing between the two adjustment members 82 at axially opposing ends of the adjustment assembly.

Each hinge further includes an outer cuff 88 mounted on the proximal end of the corresponding support arm 44 or 46 which is sized to be mounted about the tubular bushing 80 received therein. More particularly, the outer cuff 88 comprises a sleeve which is split along one side thereof so that the cuff is generally C-shaped in profile along the length thereof in the axial direction. A pair of end flanges 90 protrude radially from the outer cuff on the circumferentially opposed ends of the cuff so that fasteners spanning the circumferential split gap in the outer cuff between the two end flanges serve to circumferentially constrict the cuff about the exterior of the tubular bushing to clamp the bushing under compression between the outer cuff 88 and the inner sleeve 78. The outer cuff 88 spans in the axial direction between the side flanges 72 of the corresponding support arm to span the full length of the bushing in the axial direction. The outer cuff 88 is welded immovably to the side flanges of the support arm about part of the circumference of the cuff while part of the circumference of the cuff remains flexible relative to the support arms to permit clamping and circumferential constricting of the cuff about the bushing.

In the mounted position, the inner sleeve 78 of each hinge is supported fully within the hollow interior defined by the exterior boundary of the cross beam so that the resulting frame axis of each axle frame is located in elevation between the top and bottom flanges of the central portion of the cross beam while also being located spaced inwardly in the longitudinal direction of the trailer frame relative to fore and aft portions of the exterior boundary of the cross beam.

Each axle frame further includes a suspension seat 92 in the form of a flat plate suitable for mounting the lower end of the suspension element thereon. The suspension seat is fixed onto the top flange of the outer support arm 44 of the axle frame at the distal end of the axle frame. The lower end 40 of the suspension elements 38 is fixedly mounted onto the suspension seat 92 to extend upwardly therefrom to the upper end 42 of the suspension element which is mounted in fixed relation to a corresponding portion of one of the longitudinal beams 14 of the trailer frame that also support the mounting brackets 22 of the apparatus thereon. The upper end 42 of the suspension element 38 is thus fixed to the trailer in a common plane with the top plate of the corresponding mounting bracket 22.

As shown, a set of four hinges including the inner hinges 54 and outer hinges 52 are used to pivotally support the two axle frames relative to the crossbeam. All of the hinges remain laterally spaced apart from one another, however the two inner hinges 54 are closer to one another than they are to the respective outer hinges 52. Each hinge supports a respective one of the support arms of a corresponding axle frame to extend longitudinally of the trailer through the open rear side of the cross beam from the inner sleeve 78 of the hinge which is contained within the exterior boundary of the cross beam. The inner sleeve 78 of each hinge is further supported on a respective pair of parallel plates 76 or 66 in which the plates are anchored relative to the beam about the top, bottom and front edges of the plate to provide adequate support of the inner sleeve of the hinge relative to the trailer frame while also allowing independent adjustment of the hinges fore/aft and up/down relative to the trailer frame which in turn allows the angular orientation of the corresponding axes of rotation of the axle frame to be adjusted in two directions for purposes of aligning the two axle frames to pivot about respective frame axes which are coaxial with one another.

The configuration of the cross beam described above provides two mounting bracket 22 which can be fastened to the bottom flanges of the two longitudinal beams of the trailer frame that define corresponding mounting elements of the trailer that support the apparatus 10 thereon. The raised upper surfaces of the mounting brackets relative to the top flange of the crossbeam results in the crossbeam being supported at a location spaced below the upper mounting surface of the mounting brackets. Each mounting bracket 22 provides rigid support between the cross beam and the longitudinal beams of the trailer frame by forming the mounting brackets as a box frame integrated into the ends of the crossbeam. The box frame thus comprises parallel top and bottom flanges, the parallel plates 66 spanning the full height between the top and bottom, and an extension of the web flange 62 that fully spans a height of the box frame between the top and bottom flanges and the width of the box frame between the parallel plates 66, at the front side of the crossbeam.

Turning now to FIGS. 8 through 12, according to a second embodiment of the apparatus 10, the crossbeam 20 comprises a singular tube of rectangular cross section spanning the full length in the lateral direction between the mounting brackets 22 at the opposing ends. The mounting brackets in this instance each comprise a channel having a web comprising a flat plate 100 at the top side of the channel and two depending flanges extending down from opposing sides of the top plate to mount the top plate relative to the cross beam. The top plate 100 defines a mounting surface which is elongated longitudinally of the trailer and include suitable fastener apertures for fastening in flat abutment against the bottom side of a corresponding one of the longitudinal beams 14 of the trailer.

Each axle frame in this instance includes a singular pivot shaft 102 that spans across the full width of the axle frame in connection with both the inner hinge 54 and the outer hinge 52 of the axle frame. The outer hinge 52 further comprises a semicircular recess 104 formed in the rear of the channel of the corresponding mounting bracket 22 at the end of the crossbeam at a location in elevation between upper and lower boundaries of the crossbeam. A clamp body 106 of the outer hinge includes a corresponding semicircular recess therein and cooperating flanges 108 at diametrically opposing sides of the clamp body for fastening to corresponding fastener flanges on the channel of the mounting bracket 22. This enables clamping of the clamp body 106 against the channel of the mounting bracket 22 so that a cylindrical cavity is formed by the mating semicircular recesses. The cylindrical cavity receives the outer end of the pivot shaft 102 clamped therein in a mounted position.

The inner hinge 54 includes a mounting block 110 fixedly mounted to the crossbeam to protrude longitudinally of the trailer from the rear of the crossbeam in alignment with the inner end of the pivot shaft 102. A semicircular recess within the rear of the mounting block 110 mates with a corresponding semicircular recess within a clamp body 112 with fastener flanges 114 at diametrically opposing sides of the semicircular recess on the clamp body 112 that serve to fasten the clamp body 112 against the mounting block 110. In the mounted position of the clamp body 112 against the mounting block 110, the semicircular recesses mate with one another to define a cylindrical cavity similar to the outer hinge so that the cylindrical cavity of the inner hinge is arranged to receive and clamp the inner end of the corresponding pivot shaft 102 therein.

The inner and outer support arms 44 and 46 of the axle frames in this instance comprise tubes of rectangular cross-section that are again joined to one another in spaced apart relationship by the proximal crossbar 50 and the distal crossbar 48. The distal crossbar is connected across the distal ends of the support arms. The proximal crossbar 50 communicates through the walls of the tubing forming the support arms in the form of a sleeve having an interior diameter that closely matches the outer diameter of the pivot shaft 102 received therethrough between the two hinges which are spaced apart by the width of the axle frame in the axial direction to receive the axle frame spanning the full width between the two hinges. The pivot shaft 102 is supported by the hinges at a location spaced longitudinally of the trailer rearwardly of the cross beam so that the proximal ends of the support arms remain spaced longitudinally rearward of the beam so as not to interfere with pivotal movement of the axle frame relative to the cross beam. As in the previous embodiment, the axle frame remains fully open between the support arms of the axle frame in the lateral direction and fully open between the crossbars in the longitudinal direction.

A seat 116 for the suspension element 38 is provided on the distal crossbar 48 in the form of a flat rigid plate that is fixed onto the top side of the distal crossbar while occupying the width between the inner and outer support arms in the lateral direction. The plate forming the seat 116 provides a generally horizontal supporting surface for mounting the lower end 40 of the suspension element thereon.

The apparatus 10 according to the second embodiment further includes an abutment member 120 in association with each axle frame. The abutment member 120 serves to support the upper end 42 of the respective suspension element 38 in fixed relation relative to the trailer frame. The abutment member 120 is fixedly attached at a forward or lower end 122 on the forward side of the crossbeam at a location which is laterally centred between the support arms of the corresponding axle frame in the lateral direction. The abutment member 120 is sloped upwardly and rearwardly over top of the crossbeam while also forming a fixed connection to the top side of the crossbeam for additional support. The abutment member 120 continues to slope upwardly and rearwardly above the crossbeam to a rear or top end 124 of the abutment member which is spaced directly above the distal end of the corresponding axle frame. The top end of the abutment member 120 forms a mounting plate 126 which is flat and horizontal in orientation so as to be parallel and spaced above the upper mounting surface of the mounting brackets 22 at a location spaced laterally inwardly relative to the corresponding mounting bracket 22. The mounting plate 126 of the abutment member defines an abutment end that is thus suitably located and oriented for mounting the upper end 42 of the corresponding suspension element 38 abutted thereon.

Each abutment member 120 is formed of a channel having a generally U-shaped profile to include a central web 128 extending laterally between two side flanges 130 which depend downwardly from the laterally opposing edges of the central web 128. The side flanges 130 are shaped at the bottom edge thereof adjacent the forward end 122 to conform to the perimeter shape of the top and forward side of the crossbeam to which they are fixedly attached. The web 128 primarily slopes upwardly and forwardly from the forward end 122 over top of the cross beam towards the rear end, but then transitions into the horizontal mounting plate 126 at the top or rear end 124.

In a mounted position on the trailer frame, in which the upper mounting surfaces of the mounting brackets 22 are fixed and fastened to the bottom sides of the longitudinal beams 14 of the trailer respectively, the abutment members 120 are accordingly positioned laterally inwardly relative to the corresponding mounting brackets while extending upwardly beyond the bottom surfaces of the longitudinal beams 14. Accordingly the suspension elements 38 in this instance extend upwardly into the trailer frame in the area or space between the longitudinal beams 14 of the trailer when the mounting brackets are secured to the bottom of the longitudinal beams 14 that define the mounting elements of the trailer onto which the suspension apparatus 10 is mounted. The suspension elements 38 are thus supported at their upper ends relative to the trailer frame by the cantilevered configuration of the abutment members relative to the cross beam. The top or rear end of the abutment member thus forms an abutment end engaging the upper end of the gasbag spring 38 thereon for transferring loads from the upper end of the gasbag spring to the abutment member. The abutment member has an opposed bottom or forward end mounted on the cross beam so that the abutment member is cantilevered from the beam to the abutment end and so that loads from the upper end of the gasbag spring are communicated through the abutment member to the crossbeam and from the crossbeam to the trailer frame. When a shock absorber is optionally associated with each axle frame, the shock absorber may extend upward from the stub axle or the support arms of the axle frame to the cantilevered abutment member as well.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. An independent suspension apparatus for a trailer having a trailer frame including two mounting elements at transversely spaced positions on the trailer, the independent suspension apparatus comprising:
   a cross beam arranged to be mounted on the trailer to extend in a lateral direction across the trailer for connection to the two transversely spaced mounting elements of the trailer;
   first and second axle frames supported at respective ends of the cross beam;
   the first and second axle frames extending longitudinally of the trailer from respective proximal ends of the axle frames pivotally supported on the cross beam at spaced apart positions in the lateral direction to respective distal ends of the axle frames for independent pivotal rotation of the axle frames about respective frame axes parallel to the beam;
   first and second stub axles supported on the distal ends of the first and second axle frames respectively with each stub axle extending parallel to the beam;
   each stub axle including a wheel mount hub for mounting a wheel for rotation about an axis parallel to the beam with the wheel mount hub located outwardly of a respective end of the beam;
   each axle frame having a suspension element mounted on the distal end of the axle frame providing sufficient load bearing compression to support weight of the trailer thereon; and
   each axle frame having two hinges pivotally supporting the axle frame on the cross beam, the hinges of each axle frame being spaced apart in the lateral direction from one another and from the hinges of the other axle frame.

2. The apparatus according to claim 1 wherein each hinge includes at least one adjustment member enabling adjustment of the frame axis of the respective axle frame to be adjusted relative to the cross beam in at least two directions whereby the axle frames are independently adjustable in orientation relative to the cross beam.

3. The apparatus according to claim 1 further comprising:
the beam having two mounting brackets each for attachment to a respective one of the transversely spaced mounting elements of the trailer; and
the two hinges of each axle frame include an outer hinge located at a corresponding one of the mounting brackets and an inner hinge spaced laterally inwardly from the mounting bracket.

4. The apparatus according to claim 3 wherein the inner hinges are laterally spaced apart from one another.

5. The apparatus according to claim 1 further comprising:
each axle frame having an outer support arm and an inner support arm extending longitudinally of the trailer from the two hinges of the axle frame respectively to the distal end of the axle frame;
each hinge having a shaft supported on the cross beam, a cuff fixedly mounted on the respective support arm, and a bearing member received within the cuff and pivotally supporting the respective support arm on the shaft.

6. The apparatus according to claim 1 wherein each hinge is supported on the beam between a top and a bottom of the beam in elevation.

7. The apparatus according to claim 1 wherein the cross beam includes a plurality of flanges extending along a length of the cross beam and defining an exterior boundary of the cross beam, the frame axis of each axle frame being situated within an exterior boundary of the cross beam.

8. The apparatus according to claim 1 wherein the cross beam comprises a C-shaped channel which is open along one side of the cross beam.

9. The apparatus according to claim 1 further comprising:
the cross beam including a plurality of flanges extending along a length of the cross beam and defining an exterior boundary of the cross beam;
each hinge including (i) a shaft pivotally supporting a portion of the respective axle frame thereon and (ii) a pair of parallel mounting plates supporting the shaft thereon; and
each mounting plate being fixedly mounted onto two flanges among the plurality of flanges of the cross beam.

10. The apparatus according to claim 1 wherein each axle frame further comprises:
an outer support arm and an inner support arm extending longitudinally of the trailer from the two hinges of the axle frame respectively to the distal end of the axle frame;
a distal crossbar connected between the inner support arm and the outer support arm at the distal end of the axle frame; and
a proximal crossbar connected between the inner support arm and the outer support arm at the proximal end of the axle frame so as to be spaced apart from the distal crossbar.

11. The apparatus according to claim 10 wherein the proximal crossbar is spaced longitudinally of the trailer from the frame axis of the axle frame.

12. The apparatus according to claim 10 wherein each axle frame further comprises an intermediate crossbar connected between the inner support arm and the outer support arm at an intermediate location spaced longitudinally of the trailer from the distal crossbar and the proximal crossbar.

13. The apparatus according to claim 1 further comprising:
the suspension element having a lower end mounted on a seat on the respective stub axle;
an abutment member having an abutment end engaging an upper end of the suspension element for transferring loads from the upper end of the suspension element to the frame; and
the abutment member having an opposed end mounted on the beam so as to be cantilevered from the beam to the abutment end and so that loads from the upper end of the suspension element are communicated through the abutment member to the beam and from the beam to the frame.

14. An independent suspension apparatus for a trailer having a frame including two mounting elements at transversely spaced positions on the trailer, the independent suspension apparatus comprising:
a beam arranged to be mounted on the trailer and to extend across the trailer for connection to the two transversely spaced mounting elements of the trailer;
first and second coaxial stub axles mounted at respective ends of the beam with each stub axle extending parallel to the beam;
each stub axle including a wheel mount hub for mounting a wheel for rotation about an axis parallel to the beam with the wheel mount hub located outwardly of a respective end of the beam;
each stub axle having a respective pair of support arms extending longitudinally of the trailer from the beam to the respective stub axle with the respective pair of support arms being pivotally mounted relative to the beam for pivotal rotation about an axis parallel to the beam;
each stub axle having a suspension element with a lower end mounted on a seat on the respective stub axle;
and an abutment member having an abutment end engaging an upper end of the suspension element for transferring loads from the upper end of the suspension element to the frame;
the abutment member having an opposed end mounted on the beam so as to be cantilevered from the beam to the abutment end and so that loads from the upper end of the suspension element are communicated through the abutment member to the beam and from the beam to the frame.

15. The apparatus according to claim 14 wherein the abutment member is mounted on the cross beam at a forward end of the abutment member and extends upwardly and rearwardly therefrom.

16. The apparatus according to claim 14 wherein the cross beam includes two mounting brackets each for attachment to a respective one of the mounting elements of the trailer and wherein each abutment member is mounted on the beam at position on the beam inward of the mounting bracket.

17. The apparatus according to claim 14 wherein the mounting elements of the trailer comprise respective ones of two parallel beams of the frame of the trailer with the abutment members extending from the cross beam upwardly to an area between the parallel beams of the frame.

18. The apparatus according to claim 14 wherein each axle frame has an outer support arm and an inner support arm extending longitudinally of the trailer from the two hinges of the axle frame respectively to the distal end of the axle frame, and wherein the suspension element and its seat are mounted between the support arms in the lateral direction.

19. The apparatus according to claim 14 wherein the abutment end engaging the upper end of the suspension element forms a flat plate.

20. The apparatus according to claim 14 wherein the abutment member comprises a channel member with the upper end of the suspension element carried on a web of the channel member and with two depending sides of the channel member.

\* \* \* \* \*